March 3, 1959
F. A. NEUBAUER
2,875,597
FLEXIBLE CABLE
Filed Nov. 18, 1954
2 Sheets-Sheet 1
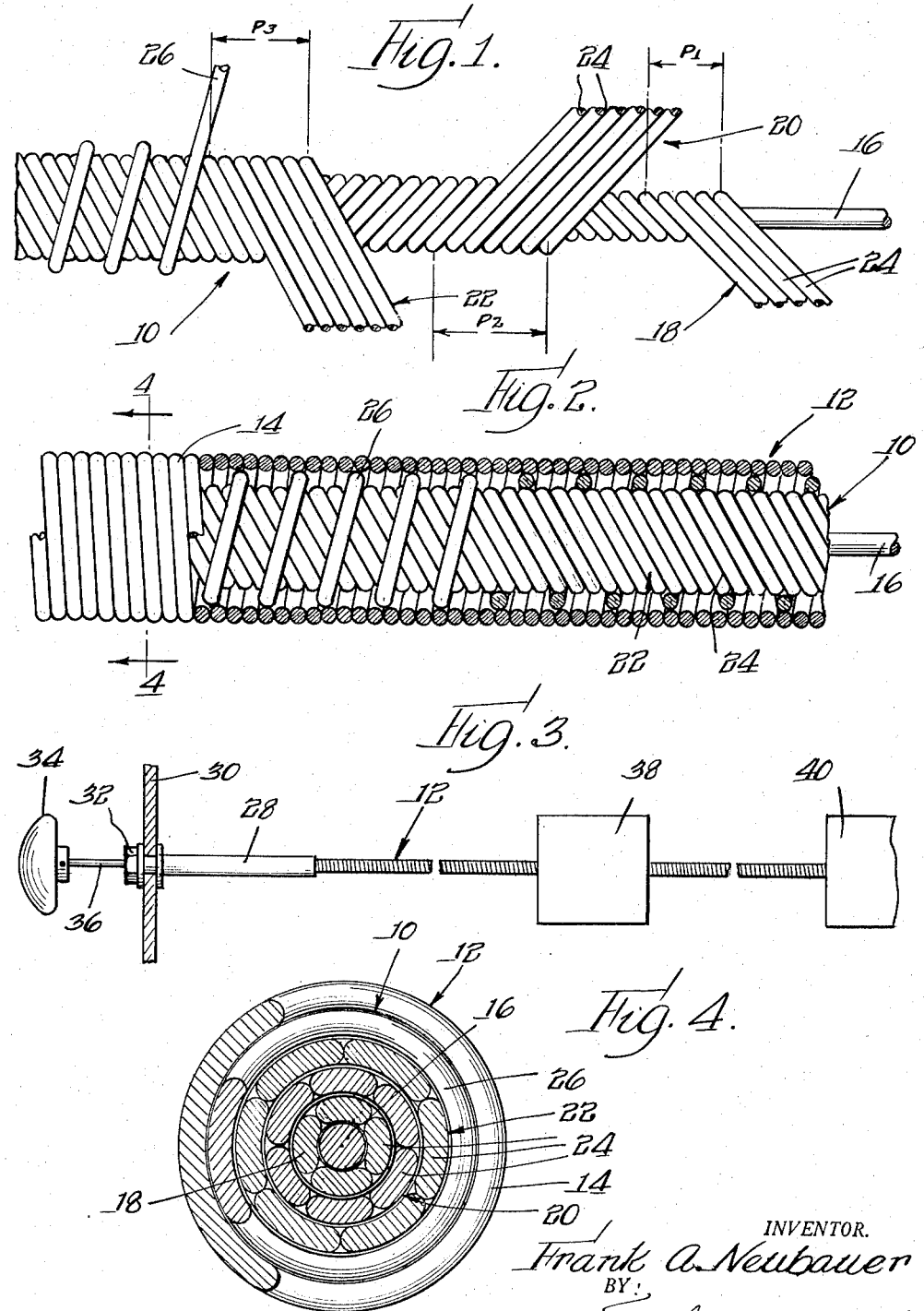
INVENTOR.
Frank A. Neubauer
BY Olson & Trexler
attys.

March 3, 1959  F. A. NEUBAUER  2,875,597
FLEXIBLE CABLE
Filed Nov. 18, 1954  2 Sheets-Sheet 2

INVENTOR.
Frank A. Newbauer
BY:
Olson & Trexler
Attys.

United States Patent Office 2,875,597
Patented Mar. 3, 1959

2,875,597
FLEXIBLE CABLE

Frank A. Neubauer, North Wales, Pa., assignor to Teleflex Incorporated, North Wales, Pa., a corporation of Delaware Application November 18, 1954, Serial No. 469,757

6 Claims. (Cl. 64—2)

This invention is concerned with remote control apparatus, more particularly with flexible cables of the push-pull or rotary variety.

Flexible cables for transmission of rotary force are well known in the art and have been constructed in a variety of forms. Such cables generally are constructed with a central wire which preferably is solid, but may be stranded, surrounded by one or more helical wire coils. Such cables are mounted in sheaths or guideways which usually are flexible and which most commonly are in the form of a helically twisted wire. The inner or control cable may be rotated for controlling a remote mechanism, or it may be pushed or pulled for effecting such control. In the case of power shafting by means of such cables, in this case known as torque cables, it has been quite generally known that a substantial amount of torque can be transmitted in a forward or positive direction, but that the torque that can be transmitted in the reverse or negative direction is very much less. Thus, prior torque cables have had greatly reduced capacities when used in both directions.

Accordingly, it is an object of this invention to provide a flexible torque cable having improved torque characteristics when used in both directions.

Furthermore, it is an object of this invention to provide a flexible cable having a reduced mass for any given cross section without any loss in torsional properties.

In addition, it is an object of this invention to provide a flexible torque cable having superior torsional properties per unit of weight.

Another object of this invention is to provide a flexible control cable having increased flexibility.

A further object of this invention is to provide a flexible cable having a helix wire provided with a lubrication reservoir.

Yet another object of this invention is to provide a torque cable having a special helix wire of non-circular cross-section imparting improved characteristics to the cable.

More specifically, it is an additional object of this invention to provide an improved flexible cable having a helix wire which supports the cable throughout a greater proportion of its length than is done by prior helix wires.

Other and further objects and advantages of the present invention will be apparent from the following description when taken in connection with the accompanying drawings, wherein:

Fig. 1 is a plan view of a partially unwrapped cable constructed in accordance with the principles of my invention;

Fig. 2 is a plan view of a portion of the cable in the sheath with the sheath partially broken away;

Fig. 3 is a side view of the cable as it might be installed for controlling by both rotary and push-pull motion;

Fig. 4 is a cross-sectional view through the cable and sheath as taken along the line 4—4 in Fig. 2;

Figure 5:
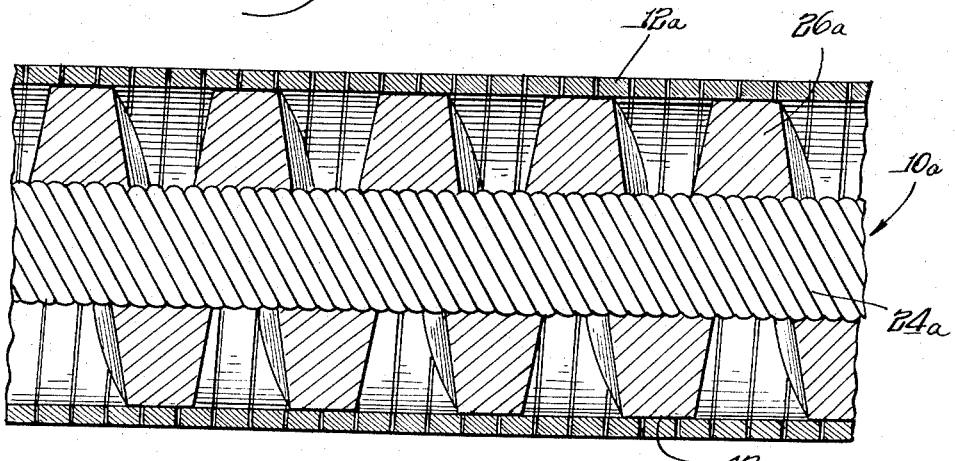
Fig. 5 is a longitudinal sectional view generally similar to Fig. 2 and showing a preferred form of the invention.

Referring now in greater particularity to the figures there will be seen a flexible control member or cable 10 slidably and rotatably mounted in a sheath 12. The sheath may be of any known or suitable type and for purposes of illustration is shown as being the usual helically coiled single wire 14. The control member 10 comprises a king wire 16 which is of solid construction to afford greater strength and increased service life over stranded wires.

Control member 10 further includes three wrappings or lays 18, 20, and 22 of wires all of which hereinafter will be identified by the numeral 24 and which will be referred to as lay wires. All of the lay wires 24 are of the same diameter, and the pitches of the lays or wrappings 18, 20, and 22 are substantially equal. The term "pitch" refers to the distance between turns of the same wire, and the pitches in question are respectively indicated as $P_1$, $P_2$, and $P_3$, the winding of the lay 20 being the reverse of that of the lays 18 and 22. It will be observed that the number of wires per lay increases moving outwardly from the king wire. In the illustrative embodiment the lay or wrapping 18 comprises four wires, the lay 20 comprises six wires, and the lay 22 comprises six wires. The number of wires per lay moving outwardly from the king wire increases in accordance with a definite pattern, such pattern being variable in accordance with the relative diameters of the king wire and the lay wires. The three lays of the illustrative embodiment comprises the preferred number of lays.

A helix wire 26 is wrapped around the outside of the lay 22, and in the opposite direction therefrom, the turns of the helix wire being spaced from one another. The helix wire is wound tightly on the outer lay, and the lays are wound tightly on one another and on the king wire so as to prevent any slippage between wires.

The helix wire serves several purposes including providing strength and with the lay 20 giving high torque in a reverse direction, providing a small frictional contact area with the sheath 12 as will be noted in Fig. 2, and also including engagement with a controlled member such as a worm wheel for operation thereof.

After winding of the inner cable or control member 10 in the manner heretofore indicated, this member is heat treated to relieve stress therein, thereby permanently imparting the helical shapes to the wires as shown. Accordingly, the cable can be cut off without the necessity of clamping, welding, brazing, or soldering the cut end.

The flexible cable heretofore shown and described is effective for transmitting either rotary or linear motion as previously has been indicated. As shown in Fig. 3 the sheath 12 is provided with a mounting sleeve 28 at one end thereof. This sleeve projects through a suitable aperture in a panel 30 and is secured therein by means such as a nut 32. A control knob 34 is mounted on a member 36 extending into the sleeve 28 and connected with the control member or cable 10. The cable and sheath extend through a controlled device 38, the sheath being interrupted within the device for engagement with the helix wire 26, or otherwise for coupling to the control member to control a device by rotary motion of the control member. The sheath and control member also extend to another controlled device 40 which is operable by push-pull motion and which is preferably connected to the cable 10. Thus, the same cable can be used for selectively controlling two different devices, one of them by rotary motion and one of them by push-pull motion.

Flexible cables constructed in accordance with the foregoing description have been found to be more flexible than prior cables and have improved yield strength, unit deflection, and breaking strength in both directions on the basis of equal weights. The approximately constant pitch and opposite directions of wrap bring about the foregoing benefits and also afford a minimum mass for any given cross-sectional area. It is generally considered that flexible shafts can be operated with a running torque of only about 25% of the torsional breaking strength, but tests indicate that my improved cable can operate at 50% to 75% of the yield strength, the yield strength generally running around 50% of the breaking strength, and my cable accordingly operates entirely satisfactorily at 25% to 35% of the torsional breaking strength. In certain cables constructed in accordance with the principles of this invention operation for ten million cycles at 31% of the torsional breaking strength has been carried on with no signs of deterioration. It has been found that the helix wire materially increases the torsional properties of the cable, the amount of increase depending upon a number of factors not fully known or evaluated at the present time.

A flexible cable constructed in accordance with the principles of this invention has been found to be two to three times more flexible than a competing cable of conventional construction for equal diameters. When compared with conventional power drives based on equal torque capacity, my cable has a tensile yield as much as 140% higher and a tensile breaking strength approximately 100% higher. The cable has been found to have a higher tensile yield value. The cable is approximately 10% to 15% stronger in tension, and weighs from 30% to 42% less than competing cables for equal diameters.

Figure 6:
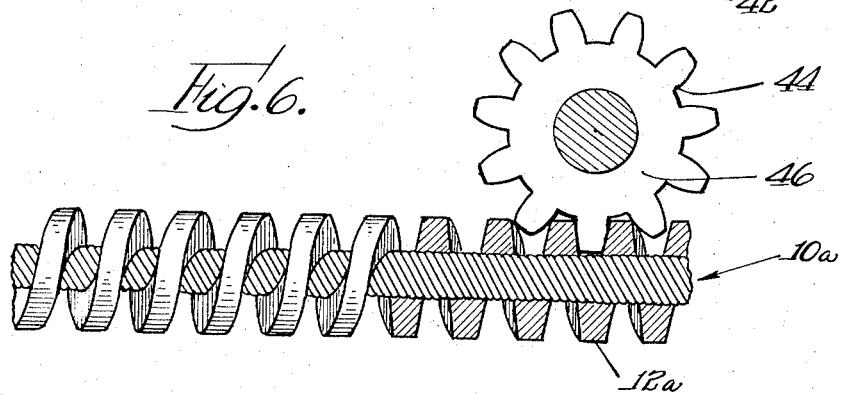
Fig. 6 is a side view of the flexible cable showing its co-operation with a gear.
Figure 7:
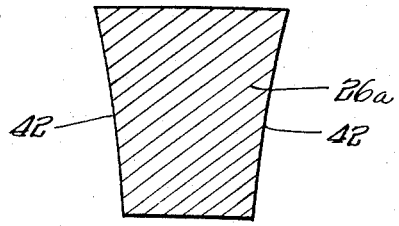
Fig. 7 is an enlarged cross-sectional view of the improved helix wire showing the lubricant retaining reservoir thereof.

Still further improvement in operating characteristics has been attained by utilizing a helix wire of trapezoidal cross section. This construction is shown in Figs. 5–7 wherein similar numerals with the addition of the suffix $a$ are utilized to identfy similar parts. The sheath 12$a$ preferably is made of flat wire, rather than the round wire previously illustrated. The core of the cable 10$a$ remains as before, comprising a king wire with a plurality of lays 24$a$ of wires wound thereon. The difference lies in the configuration of the helix wire 26$a$. This helix wire is provided with a trapezoidal cross section, and in the illustrative embodiment the height of the cross section is slightly greater than the maximum width. The side surfaces 42 of the trapezoidal helix wire are very slightly concave to retain lubricant between the helix wire and a co-operating gear or the like.

As may be seen in Fig. 6, this trapezoidal helix wire co-operates with the teeth 44 of a gear 46 in an improved manner as compared with a round helix wire. Engagement of the gear teeth 44 of the helix wire 12$a$ may be likened to the engagement of a conventional rack and pinion, or a conventional worm wheel. In short, there is a better surface engagement resulting in even driving without the necessity of producing special gear teeth than is possible with a round helix wire.

It has been found that the breaking strength with the trapezoidal wire was increased by 75% in the forward direction, and 50% in the reverse direction as compared to a cable of similar size having a round helix wire. This increase in performance is attributed to the change in shape of the helix wire which results in reducing the length of unsupported core. Since a greater portion of the core length is supported, then the torsional rigidity and breaking strength are improved substantially.

It will be apparent to those skilled in the art that various changes can be made in the illustrative structure specifically shown and described. Such changes are to be construed as forming a part of my invention insofar as they fall within the spirit and scope of the appended claims.

I claim:

1. A flexible force transmitting cable comprising a flexible core, and a helix wire wound about said core, the turns of said helix wire being spaced from one another, and the cross section of said helix wire being substantially trapezoidal, the sides thereof being slightly concave to provide lubricant reservoirs.

2. A flexible force-transmitting cable comprising base wire means, a plurality of lays of wire wrapped on said base wire means and on one another, the lays being of different diameters, said lays having an approximately equal pitch, and a helix wire wrapped around said lays, the turns of said helix wire being spaced from one another, said helix wire having recess means providing a lubricant reservoir.

3. A flexible force-transmitting cable comprising a base, a plurality of lays of wire wrapped on said base and on one another, successive lays being wound in opposite directions, the lays being of different diameters, all of the wires of said lays being of equal diameter, and a helix wire wrapped around the outermost lay, the turns of said helix wire being spaced from one another, said helix wire having recess means providing a lubricant reservoir.

4. A flexible force transmitting cable comprising base wire means, a plurality of lays of wire wrapped on said base wire means and on one another, the lays being of different diameter, said lays having an approximately equal pitch, and a helix wire wrapped around said lays, the helix wire having a trapezoidal cross section and being permanently affixed to and movable with said lays, the turns of said helix wire being spaced from one another.

5. A flexible force transmitting cable comprising a base, a plurality of lays of wire wrapped on said base and on one another, successive lays being wound in opposite directions, the lays being of different diameters, all of the wires of said lays being of equal diameters, and a helix wire wrapped around and permanently affixed to and movable with said lays, the turns of said helix wire being spaced from one another and the helix wire having a substantially trapezoidal cross section.

6. A flexible force transmitting cable comprising flexible base wire means, a plurality of concentric lays of wire wound on said base wire means, each of said lays comprising an even number of wires and being of helical configuration, all of said lays being of approximately equal pitch, alternate lays being reversely wrapped, the lays being of different diameters, all of the wires of said lays being of equal diameter, the outer lay having more wires than the inner lay, and a helix wire wrapped around said lays and permanently affixed to and movable therewith, said helix wire being wound in the opposite direction from the outer lay, the turns of said helix wire being spaced apart by at least substantially as much as the diameter of said helix wire.

References Cited in the file of this patent

UNITED STATES PATENTS

| | | |
|---|---|---|
| 571,869 | Stow | Nov. 24, 1896 |
| 906,113 | Curtis | Dec. 8, 1908 |
| 1,943,087 | Potter et al. | Jan. 9, 1934 |
| 1,952,301 | Webb | Mar. 27, 1934 |
| 1,990,514 | Angell | Feb. 12, 1935 |
| 1,996,689 | Rohs | Apr. 2, 1935 |
| 2,706,417 | Waner | Apr. 19, 1955 |

FOREIGN PATENTS

| | | |
|---|---|---|
| 681,522 | France | Feb. 3, 1930 |
| 690,014 | Great Britain | Apr. 8, 1953 |